H. C. WILCOX.
Coffee-Urn.
No. 160,633.  Patented March 9, 1875.
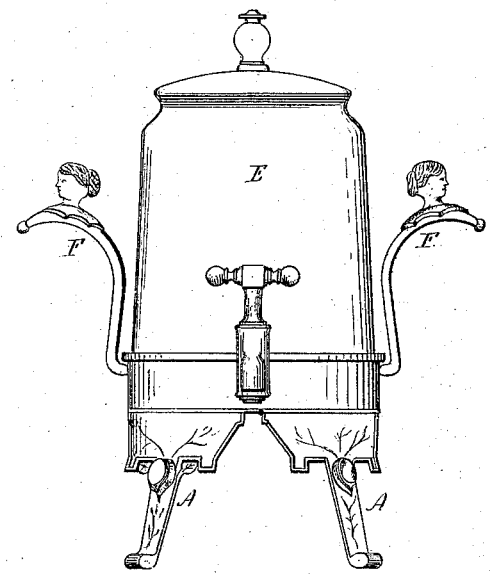
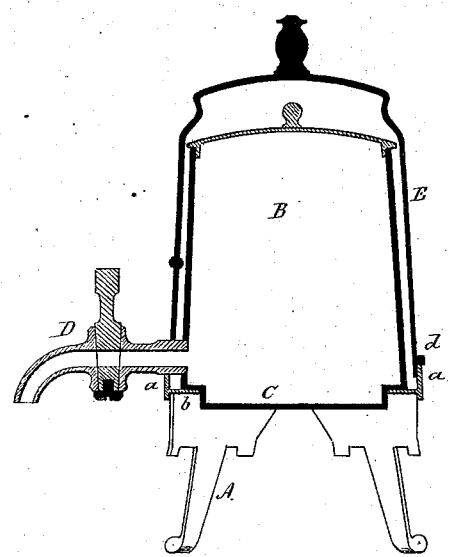

UNITED STATES PATENT OFFICE.

HORACE C. WILCOX, OF WEST MERIDEN, CONNECTICUT.

IMPROVEMENT IN COFFEE-URNS.

Specification forming part of Letters Patent No. 160,633, dated March 9, 1875; application filed February 11, 1874.

*To all whom it may concern:*

Be it known that I, HORACE C. WILCOX, of West Meriden, in the county of New Haven and State of Connecticut, have invented a new Improvement in Coffee-Urn; and I do hereby declare the following, when taken in connection with the accompanying drawings and the letters of reference marked thereon, to be a full, clear, and exact description of the same, and which said drawings constitute part of this specification, and represent, in—

Figure 1, a front view, and in Fig. 2 a vertical central section.

This invention relates to an improvement in what are commonly known as coffee-urns, such as are used upon the table from which to draw coffee, tea, or whatever may be placed therein, the general term coffee-urn being understood to embrace all purposes for which the urn may be used.

As usually constructed, the tea or coffee is first drawn and then poured into the urn, and there kept hot by a flame of some character beneath, as, owing to the construction of the urn, it is not adapted to be set upon the stove to serve the double purpose of making the coffee and for use upon the table.

The object of this invention is the construction of the urn so that it may serve such double purpose; and it consists in an inner vessel, constructed of any suitable material, which may be set upon the stove, and within which to make the tea or coffee, or heat whatever is desirable, combined with a base fitted to receive the lower end of said vessel, and an outer case or covering to set on over the inner vessel when placed on the said seat and fit closely around the faucet of the inner vessel and upon the base, but the said outer casing of larger diameter than the inner casing, so as to leave a space or chamber in the outer casing around the inner vessel, and so that when set together the outer casing and base have the appearance of an ordinary urn.

The base is formed by an annular or vertical flange, $a$, supported upon legs A in substantially the usual manner of coffee-urns. Inside this base a flange, $b$, projects inward and forms a seat, upon which the inner vessel B is to rest. The said inner vessel is formed from any suitable material; but if from metal, it should be of such hard metal that it may be placed upon the stove to be heated. The bottom C is fitted to the seat $c$, so as to be held in a central position thereon. The vessel B is provided with a faucet, D, and a recess is made in the base $a$, into which the faucet will set, and thus serve as a guide for its proper relative position. E is the casing, which is of a larger internal diameter than the external diameter of the vessel B, and is constructed with an external flange, $d$, near its bottom to rest upon the base $a$, the lower end of the casing passing within the base, and a notch made in the lower edge of the case, to pass over and close tightly around the faucet. The casing extends over and so as to close the top, as seen in Fig. 2.

The tea, coffee, or whatever it may be, is put in the vessel B, and that set upon the stove and heated to the desired extent. The vessel is then set into the seat on its base and the casing E placed over it, inclosing the vessel B. The chamber between the vessel and casing prevents contact with the external atmosphere, and the tea or coffee within the inner vessel will retain its heat for a great length of time without a flame beneath. Thus I retain all the beauty and desirability of the urn and avoid pouring the tea or coffee from the vessel in which it is made into the urn.

A handle, F, of any desirable form, for convenience of handling the urn, is placed upon each side of the base, and by which the vessel and case may be removed together.

I do not wish to be understood as broadly claiming a tea or coffee urn having a removable inner vessel, as such, I am aware, is not new.

I claim as my invention—

The base $a$, constructed with a seat, $b$, and the inner vessel B, provided with a faucet, D, and fitted to the said seat $b$, combined with the removable case E, constructed with its top closed and bottom open, so as to set over said inner vessel and rest upon said base, substantially as herein set forth.

HORACE C. WILCOX.

Witnesses:
C. P. IVES,
ARTHUR BRADSHAW.